United States Patent [19]

Szentesi et al.

[11] Patent Number: 5,317,661
[45] Date of Patent: May 31, 1994

[54] LASER REMOVAL OF ALTERED INDEX OF REFRACTION LAYER ON GLASS FIBERS

[75] Inventors: Otto I. Szentesi; James P. Luther, both of Hickory, N.C.

[73] Assignee: Siecor Corporation, Hickory, N.C.

[21] Appl. No.: 85,791

[22] Filed: Jul. 6, 1993

[51] Int. Cl.$^5$ .............................................. G02B 6/26
[52] U.S. Cl. .................................... 385/31; 385/39; 385/85; 385/140; 385/147; 219/121.66; 219/121.17; 65/12; 65/61; 65/65; 51/283 R
[58] Field of Search ............... 385/31, 38, 39, 85, 385/95, 96, 140, 147, 33, 35, 76, 77; 219/121.61, 121.62, 121.64, 121.65, 121.66, 121.17, 121.59, 383; 65/61, 65, 12; 51/283 R, 284 R, 131.1, 131.2

[56] References Cited

U.S. PATENT DOCUMENTS

| | | | |
|---|---|---|---|
| 4,135,781 | 1/1979 | Archer | 385/78 |
| 4,272,926 | 6/1981 | Tamulevich | 51/216 R |
| 4,380,365 | 4/1983 | Gross | 385/33 |
| 4,492,060 | 1/1985 | Clark | 51/283 R |
| 4,510,005 | 4/1985 | Nijman | 156/221 |
| 4,573,760 | 3/1986 | Fan et al. | 385/85 |
| 4,905,415 | 3/1990 | Moulin | 51/124 R |
| 4,932,989 | 6/1990 | Presby | 65/2 |
| 4,986,627 | 1/1991 | Boscher et al. | 385/140 |
| 4,999,955 | 3/1991 | Saito et al. | 51/283 R |
| 5,007,209 | 4/1991 | Saito et al. | 51/283 R |
| 5,097,522 | 3/1992 | Tackett et al. | 385/53 |
| 5,136,820 | 8/1992 | Luther | 51/283 R |
| 5,168,145 | 12/1992 | Tackett et al. | 219/243 |
| 5,226,101 | 7/1993 | Szentesi et al. | 385/85 |

FOREIGN PATENT DOCUMENTS

| | | | |
|---|---|---|---|
| 0278212 | 8/1988 | European Pat. Off. | G02B 6/32 |
| 0286475 | 10/1988 | European Pat. Off. | G01J 3/26 |
| 58-108507 | 6/1983 | Japan | 385/85 |
| 58-108508 | 6/1983 | Japan | 385/85 |
| 62-237404 | 10/1987 | Japan | 385/85 |
| 1405428 | 9/1975 | United Kingdom | C03B 29/00 |
| 2175411 | 11/1986 | United Kingdom | G02B 6/32 |

OTHER PUBLICATIONS

"Formation of a Spherical Lens at Optical Fiber Ends with a CO2 Laser", U. C. Paek and A. L. Weaver, *Applied Optics*, vol. 14, No. 2, Feb. 1975.

H. M. Presby et al., "Near 100% Efficient Fiber Microlenses", *Electronics Letters*, vol. 28, No. 6, Mar. 12, 1992, pp. 582–584.

Anil Vaidya et al., "Sculpted Optical Silica Tips", *Optical Engineering*, vol. 31, No. 7, Jul. 1992, pp. 1404–1409.

*Primary Examiner*—Frank Gonzalez
*Attorney, Agent, or Firm*—J. David Abernethy

[57] ABSTRACT

Disclosed is a method of treating light waveguide ends in which the light waveguide is mechanically polished and thereafter the reflectance of the light waveguide is reduced by vaporizing at least some glass at the light waveguide end by the use of a laser beam.

15 Claims, 2 Drawing Sheets

LASER REMOVAL OF ALTERED INDEX OF REFRACTION LAYER ON GLASS FIBERS

BACKGROUND OF THE INVENTION

A method of treating glass light waveguide distal ends to obtain better return loss results was disclosed in commonly assigned U. S. patent application Ser. No. 07/898,653, now U.S. Pat. No. 5,226,101 the contents of which are incorporated herein by reference. A method was therein disclosed to mechanically polish the distal end of a glass waveguide thereafter to slightly melt the surface of said distal end to reduce return loss, the preferred means of inducing such melting being a laser.

While the method is described in said former patent achieved and proved results, potential problems remained. Melting the class at the surface of the light waveguide can alter the light waveguide surface geometry, and the degree of melting can be difficult to control. Due to the large amounts of energy needed, undesirable melting and the formation of holes in the light waveguide surface can occur. Another related problem is that of changes to the mode field diameter of the light waveguide due to dopant diffusion.

Therefore, it is believed that an improved method which retains the advantages of the former method while reducing or eliminating some of the disadvantages would be an improvement in the art.

SUMMARY OF THE INVENTION

The improved method of treating glass light waveguide ends begins, as did the former method, with mechanically polishing the light waveguide distal end. The reflectance of the light waveguide end is thereafter reduced by vaporizing at least some glass at the light waveguide distal end by use of a laser beam directed thereon. Using this method, the reflectance of the light waveguide can be brought into the range of $-45$ dB to negative $-80$ dB. While it is possible to practice the present method by directing the laser beam at the light waveguide distal end only once, results tend to improve by increasing the number of times the laser is directed against the light waveguide distal end. Repetitions can increase from 2 to 1000 times, as desired, by the user. Superior results have been obtained by employing a laser beam having a peak power in the range from 0.1 to 100 watts and a pulse duration of less than $\frac{1}{2}$ second, with the spot size of the laser beam on the light waveguide end being less than $125 \times 10^{-6}$ meters. Depending upon the type of laser used, the laser beam may have a wavelength length in the range of $0.1 \times 10^{-6}$ meters to $1.5 \times 10^{-6}$ meters, or a wavelength in the range of $8.5 \times 10^{-6}$ meters to $11.0 \times 10^{-6}$ meters.

The invention will be described with the aid of the drawings, in which.

DETAILED DESCRIPTION OF THE PREFERRED EMBODIMENT

Figure 1:
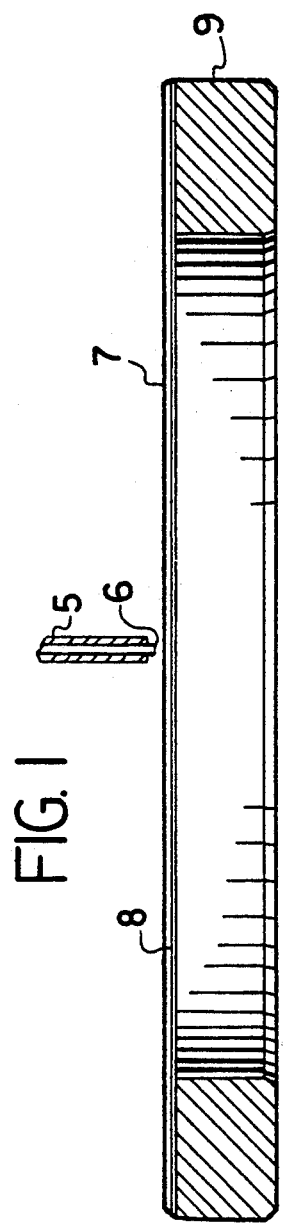
FIG. 1 is a side view of the step of mechanical polishing.

With reference to FIG. 1, ferrule 5, usually made of a ceramic or metal alloy, holds therein light waveguide distal end 6. Ferrule 5 and distal end 6 are to be ground or polished by material 8 suspended over polishing wheel 9. An aqueous slurry 7 may be optionally used in conjunction with grinding or polishing.

Figure 2:
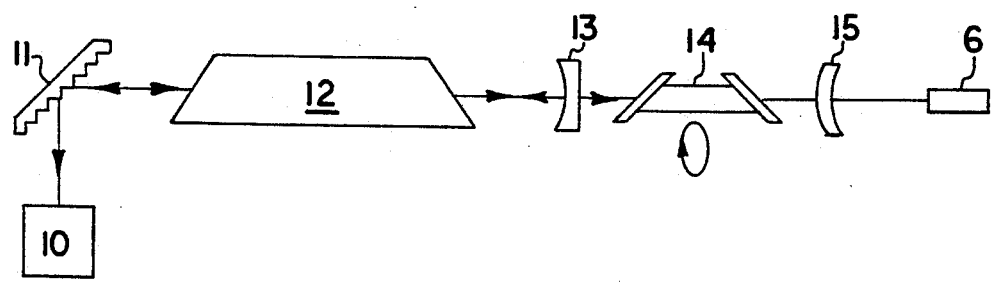
FIG. 2 is a schematic view of the polishing head optical train.

After grinding or polishing by mechanical means is complete, light waveguide distal end 6 is further treated by the polishing head optical train as shown in FIG. 2, which comprises a laser, beam attenuation and focusing optics and a light waveguide distal end. Laser 12 is an air cooled, grating tuned, continuous wave $CO_2$ laser operating in a low duty cycle pulsed mode of operation. It comprises a long life, sealed off 30 cm discharge length, 8 millimeter bore laser tube, a 135 line/millimeter Littrow mounted grating 11 and a 95% reflectivity, 1 meter radius plano concave output coupler 13 with a cavity length of 60 cm. Tuning laser 12 is accomplished by rotation of grating 11 in the horizontal plane. Due to the narrow bandwidth of $CO_2$ laser lines, it is necessary to adjust cavity length in order to lase on the line center. Cavity length adjustment may be made using an electromagnetic transducer.

Residual zero-order radiation from grating 11 is detected by pyroelectric detector 10 and used to monitor the laser energy output. An electro-mechanical shutter is mounted on the output side of laser 12 in order to prevent laser radiation from hitting light waveguide distal end 6 during adjustment of the laser.

A Brewster angled polorizer 14, consisting of two opposed ZnSe Brewster windows is used to attenuate thereby controlling the peak power incident on light waveguide distal end 6. A 50millimeter focal length, positive miniscus, AR coated GE lens 15 is used to focus laser beam 16. The lens should contain an X-Y adjustment to allow for alignment of the beam to light waveguide distal end 6 whereby the focused spot size can be adjusted using a focusing ring.

Figure 3:
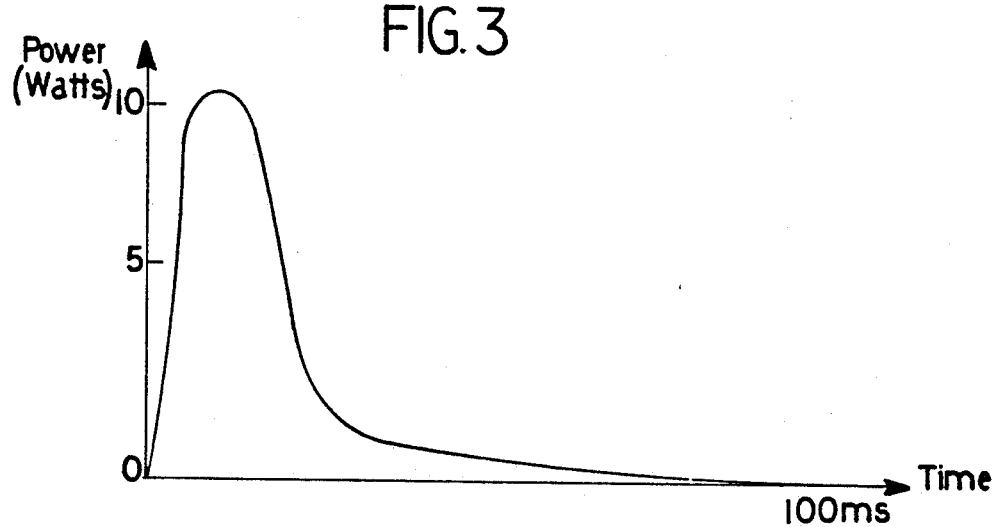
FIG. 3 is a diagram of one example of the power output of the laser.

An example of the power output of laser 12 to achieve vaporization of glass is as shown in FIG. 3. The laser power should peak quickly and then decline rapidly to achieve vaporization and avoid bulk melting of the glass on the light waveguide distal end 6.

Reflectance results of down to $-50$ dB can be achieved by mechanical polishing. Laser vaporization as herein described is found to further reduce reflectance to less than $-55$ dB after ten repetitions, and to less than $-60$ dB after forty repetitions.

This description and the drawing figures describe only one preferred example of means for practicing the claimed invention, which is to be limited only by the scope of the claims. System parameters which can be varied by the designer include laser wavelength, peak power, pulse duration, spot size, and number of repetitions of application of the laser beam.

What is claimed is:

1. A method of treating glass light waveguide ends, comprising mechanically polishing a light waveguide end and thereafter reducing the reflectance of the light waveguide end by vaporizing at least some glass at the light waveguide end by use of a laser beam directed thereon.

2. A method as described in claim 1 wherein the laser beam has a wavelength in the range of 0.1 to 1.5 $\mu$m.

3. A method as described in claim 1, wherein the laser beam has a wavelength in the range of 8.5 to 11.0 $\mu$m.

4. A method as described in claim 1, wherein the laser beam is directed at the light waveguide end in repetitions of 2 to 1000 times.

5. A method as described in claim 1, wherein the laser beam has a peak power in the range of 0.1 to 100 watts.

6. A method as described in claim 1, wherein the laser beam has a pulse duration of less than one half second.

7. A method as described in claim 1, wherein the spot size of the laser beam on the light waveguide end is less than 125 μm.

8. A method as described in claim 1, wherein the reflectance of the light waveguide subsequent to use of the laser beam is in the range of −45 dB to −80 dB.

9. A method as described in claim 8, wherein the laser beam is directed at the light waveguide end in repetitions of 2 to 1000 times.

10. A method as described in claim 8, wherein the laser beam has a pulse duration of less than one-half second.

11. A method as described in claim 8, wherein the spot size of the laser beam on the light waveguide end is less than 125 μm.

12. A method as described in claim 8, wherein the laser beam has a peak power in range of 0.1 to 100 watts.

13. A method as described in claim 12, wherein the laser beam is directed at the light waveguide end in repetitions of 2 to 1000 times.

14. A method as described in claim 12, wherein the laser beam has a pulse duration of less than one-half second.

15. A method as described in claim 12, wherein the spot size of the laser beam on the light waveguide end is less than 125 μm.

* * * * *